(12) United States Patent
Liu et al.

(10) Patent No.: US 10,744,476 B2
(45) Date of Patent: Aug. 18, 2020

(54) PRODUCTION OF WAX CAPSULES CONTAINING LIQUID HYDROPHILIC CORES

(75) Inventors: Hongwei Liu, Appleton, WI (US); Georgios D. Karles, Richmond, VA (US); Shuzhong Zhuang, Richmond, VA (US)

(73) Assignee: Philip Morris USA Inc., Richmond, VA (US)

(*) Notice: Subject to any disclaimer, the term of this patent is extended or adjusted under 35 U.S.C. 154(b) by 1854 days.

(21) Appl. No.: 12/155,067

(22) Filed: May 29, 2008

(65) Prior Publication Data

US 2009/0004337 A1    Jan. 1, 2009

Related U.S. Application Data

(60) Provisional application No. 60/924,816, filed on May 31, 2007.

(51) Int. Cl.
    *B01J 13/04*    (2006.01)

(52) U.S. Cl.
    CPC ..................... *B01J 13/04* (2013.01)

(58) Field of Classification Search
    CPC ........ A23V 2250/24; A23V 2250/5118; A23V 2250/5432; A23V 2250/628; A23V 2250/70; A23V 2200/06; A23V 2200/228; A23V 2200/242; A23G 3/34; A23G 3/42; A23G 3/44; A23L 1/05625; B01J 13/04; A23P 1/04
    USPC .................................................. 426/89, 99
    See application file for complete search history.

(56) References Cited

U.S. PATENT DOCUMENTS

| | | | |
|---|---|---|---|
| 3,265,629 A * | 8/1966 | Jensen | 427/213.33 |
| 3,389,194 A * | 6/1968 | Somerville | C03B 37/04 264/4 |
| 3,423,489 A | 1/1969 | Arens et al. | |
| 3,856,699 A | 12/1974 | Miyano et al. | |
| 4,752,485 A | 6/1988 | Sharma et al. | |
| 5,064,669 A | 11/1991 | Tan et al. | |
| 5,478,508 A | 12/1995 | Suzuki et al. | |
| 5,532,004 A | 7/1996 | Bell et al. | |
| 6,149,953 A | 11/2000 | Redding, Jr. | |
| 6,290,988 B1 | 9/2001 | Van Vilsteren et al. | |
| 6,610,337 B1 | 8/2003 | Janik et al. | |
| 2003/0077362 A1 | 4/2003 | Panhorst et al. | |
| 2007/0086941 A1 | 4/2007 | Kurokawa et al. | |

FOREIGN PATENT DOCUMENTS

| | | |
|---|---|---|
| EP | 595263 A1 * | 5/1994 |
| GB | 1276598 A | 6/1972 |
| WO | WO03/018186 A | 3/2003 |

OTHER PUBLICATIONS

International Preliminary Report on Patentability dated Dec. 1, 2009 for PCT/IB2008/001843.
Copending U.S. Appl. No. 12/002,296, filed Dec. 11, 2007.
International Search Report and Written Opinion dated Oct. 31, 2008 for PCT/IB2008/001843.

* cited by examiner

*Primary Examiner* — Jyoti Chawla

(74) *Attorney, Agent, or Firm* — Buchanan Ingersoll & Rooney PC

(57) ABSTRACT

Provided is a method for cooling wax after coextrusion to create wax capsules. The method includes immersing a concentric nozzle of a coextruder in a container of heated alcohol. The container of heated alcohol sits in a water-ice bath to create a temperature gradient. A core material having a wax coating is extruded through a concentric nozzle to form a capsule. The capsule enters the container of hot alcohol where the wax coating is solidified. In an embodiment, the method is a continuous method including a capsule and solvent transfer system.

20 Claims, 1 Drawing Sheet

PRODUCTION OF WAX CAPSULES CONTAINING LIQUID HYDROPHILIC CORES

CROSS REFERENCE TO RELATED APPLICATION

This application claims priority under 35 U.S.C. § 119(e) to U.S. provisional Application No. 60/924,816, filed on May 31, 2007, the entire content of which is incorporated herein by reference.

BACKGROUND

Flavors and other active ingredients have commonly been encapsulated for ease of working with the enclosed flavor or ingredient.

In addition, encapsulation techniques have been employed to preserve the enclosed product and increase shelf life.

Wax capsules, which can be fabricated by co-extrusion techniques, are good structures to hold hydrophilic cores for a long period of time. Exemplary encapsulation methods for creating wax capsules include spray drying and coextrusion techniques. Because the density of wax is lower than that of water and solidification of melted wax occurs quickly, special cooling equipment is needed to solidify the wax after coextrusion. One such cooling device is a cooling tower, which is expensive to purchase and complicated to use.

Thus, there remains a need in the art for a simple and inexpensive cooling system for solidifying the wax coating after coextrusion.

SUMMARY

Provided is a method for forming wax capsules. Also provided is a method for cooling wax during the formation of wax capsules.

In a preferred embodiment, the method of forming core material containing capsules includes coating a core material with a wax to form a core/shell droplet. The core/shell droplet is then contacted with hot alcohol.

Preferably, a temperature gradient is created in a container of hot alcohol by placing the container of hot alcohol in an ice water bath. The temperature at the top of the container is preferably above the melting point of the wax. The temperature of the alcohol gradually decreases towards the bottom of the container. As the core/shell droplets pass from the top of the container to the bottom of the container, the wax shell solidifies to form a capsule. The capsules fall to the bottom of the container where the capsules may later be collected.

In another embodiment, the method for making wax capsules includes immersing a concentric nozzle of a coextruder in a container of a hot ethanol. Wax from the outer nozzle coats the core material flowing through the inner nozzle to create core/shell droplets that fall from the concentric nozzle into the hot ethanol. The container of hot ethanol is placed in a water-ice bath to create a temperature gradient. As the core/shell droplets descend in the container of hot ethanol, the wax shell solidifies to create capsules.

Preferably, the method for making wax capsules is a continuous method, wherein the capsules and solvent exit the container via a capsule transfer tube. The capsules and solvent then fall into a container that includes a sieve for catching the capsules and a container leading to a solvent transfer tube. The solvent transfer tube includes a heater that heats the solvent as the solvent travels back into the container into which the concentric nozzle sends the core/shell droplets.

DETAILED DESCRIPTION

Provided is a method for manufacturing wax capsules for the encapsulation of hydrophilic substances.

In a preferred embodiment, the method for forming core material containing capsules includes coating a core material with molten wax to form a core/shell droplet.

Figure 1:
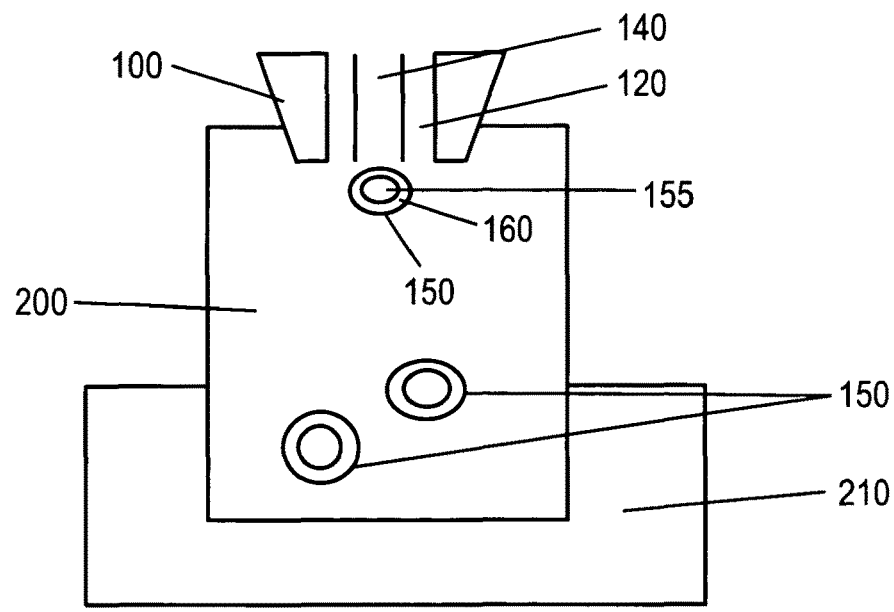
FIG. 1 is an illustration of a setup of a wax solidification cooling unit including a coextruder.

Preferably, the core/shell droplet is formed by a coextruder having a concentric nozzle 100 with an inner nozzle 140 and outer nozzle 120 as seen in FIG. 1. The core material flows through the inner nozzle 140, while molten wax flows through the outer nozzle 120 resulting in a coating being applied to the core material. The flow is broken up to form core/shell droplets exiting out of the concentric nozzle 100. As the core/shell material exits the concentric nozzle 100, surface tension causes the core/shell material to break into droplets.

The size of the resulting core/shell droplets 150 depends on the size of the coextruder nozzle used. The choice of a coextruder nozzle may rely on the type of wax capsules being manufactured and the intended use. In a preferred embodiment, the wax capsules have a diameter of about 0.1 mm to about 5.0 mm (e.g., about 0.1 mm to about 2 mm, about 1 mm to about 3 mm, about 2 mm to about 4 mm or about 3 mm to about 5 mm).

Preferably, the concentric nozzle is placed into a container filled with a hot solvent so that the capsules pass through the nozzle 100 directly into the hot solvent. Preferably, the solvent is a hot alcohol 200.

Preferably, the core material is a hydrophilic substance. In a preferred embodiment, suitable core materials include, without limitation, pure water, aqueous solutions of flavors or other active ingredients, propylene glycol, glycerin, honey, combinations thereof, and the like.

Preferably, the wax is natural or synthetic. Suitable waxes include, without limitation, beeswax, carnauba wax, candelilla wax, castor wax, polyethylene waxes, petroleum based waxes, combinations thereof, and the like. Preferably, paraffin wax is used.

Suitable hot alcohols include, without limitation, methanol, ethanol, propanol, combinations thereof, and the like. In a most preferred embodiment, ethanol is used. The alcohol may be reused for multiple cooling processes.

Preferably, the chosen alcohol has a density that is lower than the density of the chosen molten wax. Other solvents which are not miscible with wax and have a lower density than wax may be used.

In a preferred embodiment, the capsules 150 are in liquid form when the capsules 150 exit the concentric nozzle 100. Preferably, the temperature of the hot alcohol at the top of the container, where the nozzle comes into contact with the hot alcohol, is about 2° C. to 5° C. higher than the melting point of the wax being used. If the temperature of the alcohol at the top of the container is too high, then the wax will break and the coating will not properly form. If the temperature of the alcohol at the top of the container is too low, then the nozzle may clog or the wax may solidify so quickly that the capsules aggregate.

In a preferred embodiment, the alcohol may be heated with a heating tape located in the container, placed against the container, and/or surrounds the outside of the container. Other heaters such as cartridge heaters, heating coils, etc. located inside or outside the container may also be used. Accurate control over the temperature can be maintained by using a temperature controller.

Preferably, the container of hot alcohol is placed in a cooling bath 210 to create a temperature gradient from the top of the container to the bottom of the container. Preferably, the temperature of the alcohol at the bottom of the container is about 0° C. The cooling bath may be an ice water bath.

As the capsules fall downward from the upper portion to the bottom portion through the container of alcohol 200, the wax 160 gradually solidifies over the liquid core material 155 resulting in capsules 150 with a hard, outer wax shell 160. The capsules may later be collected from the bottom portion of the alcohol container.

In another embodiment, the method for making wax capsules includes immersing a concentric nozzle of a coextruder in a container of hot ethanol. The container of hot ethanol is then placed in a cooling bath, such as a water-ice bath, to create a temperature gradient. A core material and a wax are passed through a concentric nozzle of a coextruder to form a coated capsule. The capsule is then passed into a supply of hot ethanol to solidify the wax.

Once the container is filled with capsules, the capsules can be harvested out of the container. The remaining alcohol can be used again to form additional capsules.

Figure 2:
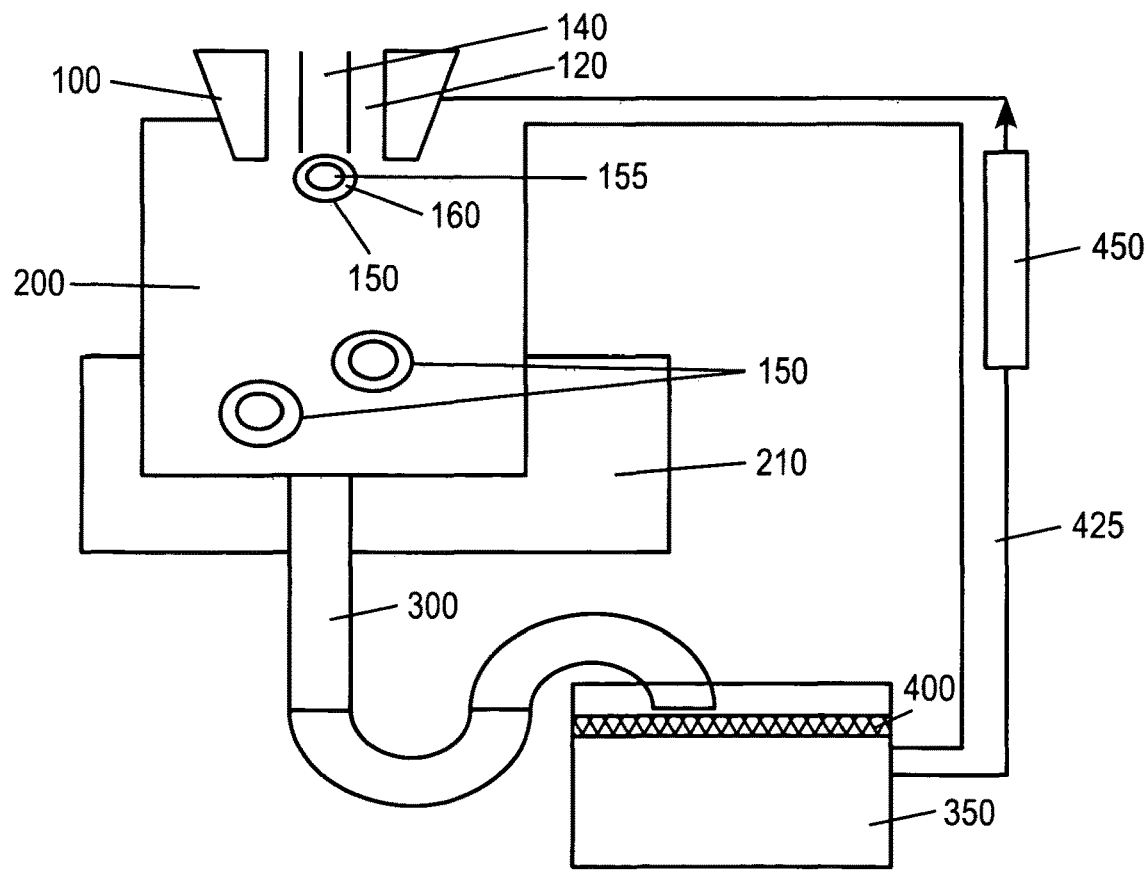
FIG. 2 is an illustration of a setup of a wax solidification cooling unit including a coextruder and a capsule transfer system with solvent return.

Preferably, the method is a continuous method. In an embodiment, the method includes connecting a transfer line 300, as seen in FIG. 2, to the bottom of the container holding the solvent 200. As the capsules 150 fall to the bottom of the container, the capsules and solvent enter the transfer line 300. The transfer line 300 leads to a second container 350. A sieve 400 extends the length of the container 350 and catches the capsules 150 as they exit the transfer line 300 and pass into the container 350. The solvent passes through the sieve 400 and is processed through the solvent transfer system 425 back into the container 200 for reuse. A heat exchanger 450 contacts the solvent transfer system 425 to heat the solvent prior to reentering the container 200.

In an embodiment, the capsules are used in oral tobacco or non-tobacco products. Preferably, the capsules are mixed with tobacco and placed in a pouched product. In an embodiment, each capsule can be individually consumed as a snack. In another embodiment, the capsules can be used as a baking or cooking ingredient.

While the foregoing has been described in detail with reference to specific embodiments thereof, it will be apparent to one skilled in the art that various changes and modifications may be made, and equivalents thereof employed, without departing from the scope of the claims.

We claim:

1. A method for forming capsules containing an encapsulated core material comprising:
    coextruding a core material of liquid hydrophilic substance and a molten wax by passage through a concentric nozzle having an inner nozzle through which the liquid hydrophilic core material passes and an outer nozzle through which the molten wax passes;
    immersing said concentric nozzle in a container of a heated liquid, said heated liquid consisting of methanol, ethanol, propanol, and combinations thereof, possessing a decreasing temperature gradient which runs vertically from an upper portion to a bottom portion of the container;
    controlling said temperature of said heated liquid in said upper portion of said container to a temperature of 2° C. to 5° C. hotter than the melting point of said molten wax by heating an inner surface and/or an outer surface of an upper portion of said container;
    passing the coextruded core material and molten wax from said concentric nozzle immersed in said upper portion of said heated liquid vertically downward through said liquid consisting of methanol, ethanol, propanol, and combinations thereof beginning at the upper portion to the lower portion to form discrete capsules wherein said molten wax is gradually solidified and coats said hydrophilic core material; and
    collecting said discrete capsules from the bottom portion of said heated liquid possessing said decreasing temperature gradient.

2. The method of claim 1, wherein said hydrophilic substance is selected from the group consisting of water, aqueous solutions of flavorants and/or active ingredients, propylene glycol, glycerin, honey, and combinations thereof.

3. The method of claim 1, wherein said liquid selected from the group consisting of methanol, ethanol, propanol, and combinations thereof has a density lower than that of said wax.

4. The method of claim 1, wherein said resulting discrete capsules following gradual solidification of molten wax sink downward to the bottom portion of said liquid selected from the group consisting of methanol, ethanol, propanol, and combinations thereof where they are collected.

5. The method of claim 1, wherein said wax is selected from the group consisting of beeswax, carnauba wax, candelilla wax, castor wax, paraffin wax, polyethylene waxes, petroleum waxes, and combinations thereof.

6. The method of claim 1, wherein the temperature of said liquid selected from the group consisting of methanol, ethanol, propanol, and combinations thereof is controlled by a temperature controller.

7. The method of claim 1, wherein the resulting capsules are substantially spherical and have a diameter of about 0.1 mm to about 5.0 mm.

8. The method of claim 1, further including passing said resulting capsules and the bottom portion of said liquid possessing said decreasing temperature gradient selected from the group consisting of methanol, ethanol, propanol, and combinations thereof into a transfer line leading to a container including a sieve for collecting said capsules and a receptacle for holding said liquid.

9. The method of claim 8, further including reheating said liquid selected from the group consisting of methanol, ethanol, propanol, and combinations thereof to a temperature about 2° C. to 5° C. hotter than the melting point of said wax while traveling through said transfer line.

10. The method of claim 1, wherein said liquid is ethanol.

11. The method of claim 1, comprising:
    heating said inner surface and/or said outer surface of said container with a heating tape placed against said inner surface of said container and/or surrounding said outer surface of said container.

12. The method of claim 1, comprising:
    controlling said temperature of said heated liquid in said bottom portion by placing said container in a cooling bath.

13. The method of claim 12, wherein said temperature of said heated liquid at said bottom portion of the container is 0° C.

14. A method for forming capsules containing an encapsulated core material comprising:
coextruding a core material of liquid hydrophilic substance and a molten wax by passage through a concentric nozzle having an inner nozzle through which the liquid hydrophilic core material passes and an outer nozzle through which the molten wax passes;
immersing said concentric nozzle in a container of a heated liquid, said heated liquid consisting of methanol, ethanol, propanol, and combinations thereof, possessing a decreasing temperature gradient which runs vertically from an upper portion to a bottom portion of the container;
controlling said temperature of said heated liquid in said upper portion of said container to a temperature of 2° C. to 5° C. hotter than the melting point of said molten wax by heating an inner surface and/or an outer surface of an upper portion of said container, and wherein said temperature of said heated liquid at said bottom portion of the container is 0° C.;
passing the coextruded core material and molten wax from said concentric nozzle immersed in said upper portion of said heated liquid vertically downward through said liquid consisting of methanol, ethanol, propanol, and combinations thereof beginning at the upper portion to the lower portion to form discrete capsules wherein said molten wax is gradually solidified and coats said hydrophilic core material.

15. The method of claim 14, wherein said resulting discrete capsules following gradual solidification of molten wax sink downward to the bottom portion of said liquid selected from the group consisting of methanol, ethanol, propanol, and combinations thereof where they are collected.

16. The method of claim 14, comprising:
selecting said wax from the group consisting of beeswax, carnauba wax, candelilla wax, castor wax, paraffin wax, polyethylene waxes, petroleum waxes, and combinations thereof.

17. The method of claim 14, comprising:
heating said inner surface and/or said outer surface of said container with a heating tape placed against said inner surface of said container and/or surrounding said outer surface of said container.

18. The method of claim 14, comprising:
controlling said temperature of said heated liquid in said bottom portion by placing said container in a cooling bath.

19. The method of claim 14, comprising:
passing said resulting capsules and the bottom portion of said liquid possessing said decreasing temperature gradient selected from the group consisting of methanol, ethanol, propanol, and combinations thereof into a transfer line leading to a container including a sieve for collecting said capsules and a receptacle for holding said liquid.

20. A method for forming capsules containing an encapsulated core material comprising:
coextruding a core material of liquid hydrophilic substance and a molten wax by passage through a concentric nozzle having an inner nozzle through which the liquid hydrophilic core material passes and an outer nozzle through which the molten wax passes;
immersing said concentric nozzle in a container of a heated liquid, said heated liquid consisting of methanol, ethanol, propanol, and combinations thereof, possessing a decreasing temperature gradient which runs vertically from an upper portion to a bottom portion of the container;
controlling said temperature of said heated liquid in said upper portion of said container to a temperature of 2° C. to 5° C. hotter than the melting point of said molten wax;
controlling said temperature of said heated liquid in said bottom portion of said container to a temperature of 0° C. by immersing said container in a cooling bath; and
passing the coextruded core material and molten wax from said concentric nozzle immersed in said upper portion of said heated liquid vertically downward through said liquid consisting of methanol, ethanol, propanol, and combinations thereof beginning at the upper portion to the lower portion to form discrete capsules wherein said molten wax is gradually solidified and coats said hydrophilic core material.

* * * * *